United States Patent
Hess et al.

(10) Patent No.: US 11,003,567 B2
(45) Date of Patent: May 11, 2021

(54) METHOD AND APPARATUS FOR TEST MODELING

(71) Applicant: International Business Machines Corporation, Armonk, NY (US)

(72) Inventors: Howard Hess, Winnetka, IL (US); Eitan Farchi, Pardes Hana (IL); Orna Raz, Haifa (IL); Rachel Tzoref-Brill, Haifa (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 15/832,783

(22) Filed: Dec. 6, 2017

(65) Prior Publication Data

US 2019/0171545 A1  Jun. 6, 2019

(51) Int. Cl.
  *G06F 11/36* (2006.01)

(52) U.S. Cl.
  CPC ...... *G06F 11/3608* (2013.01); *G06F 11/3664* (2013.01)

(58) Field of Classification Search
  CPC .................. G06F 11/3664; G06F 11/3608
  See application file for complete search history.

(56) References Cited

U.S. PATENT DOCUMENTS

| | | | | |
|---|---|---|---|---|
| 7,158,961 B1* | 1/2007 | Charikar | ................ | G06F 16/35 |
| 8,386,851 B2* | 2/2013 | Ur | ........................ | G06F 11/263 714/1 |
| 8,402,030 B1* | 3/2013 | Pyle | ...................... | G06F 16/334 707/738 |
| 8,595,676 B2* | 11/2013 | Tzoref-Brill | ..... | G01R 31/31835 716/136 |
| 8,635,177 B2* | 1/2014 | Ward | ....................... | G06F 8/34 706/47 |
| 8,719,799 B2* | 5/2014 | Adler | .................. | G06F 11/3676 717/130 |
| 8,756,460 B2* | 6/2014 | Blue | ................... | G06F 11/3676 714/38.1 |
| 8,893,086 B2* | 11/2014 | Bassin | ................... | G06Q 10/06 717/124 |
| 8,954,310 B2* | 2/2015 | Farchi | .............. | G01R 31/31835 703/21 |

(Continued)

*Primary Examiner* — Douglas M Slachta
(74) *Attorney, Agent, or Firm* — Ziv Glazberg

(57) ABSTRACT

A method, system and computer program product, the method comprising: receiving a user document describing at least a part of a system to be tested; computing a similarity measurement between the user document and documents in a document corpus, each describing at least part of a system and associated with a combinatorial model representing the at least part of the system, wherein the combinatorial model comprises a set of attributes, a respective domain for each attribute defining possible values for the attribute, and restrictions, wherein each restriction comprises at least one attribute, a respective value and a logical operator, based upon the similarity measurement, selecting selected documents from the document corpus; obtaining one or more combinatorial models corresponding to the selected documents; selecting elements from the combinatorial models; generating an initial combinatorial model for the user document, wherein said generating comprises adding the elements to the initial combinatorial model.

18 Claims, 2 Drawing Sheets

(56) References Cited

U.S. PATENT DOCUMENTS

Figure 1:
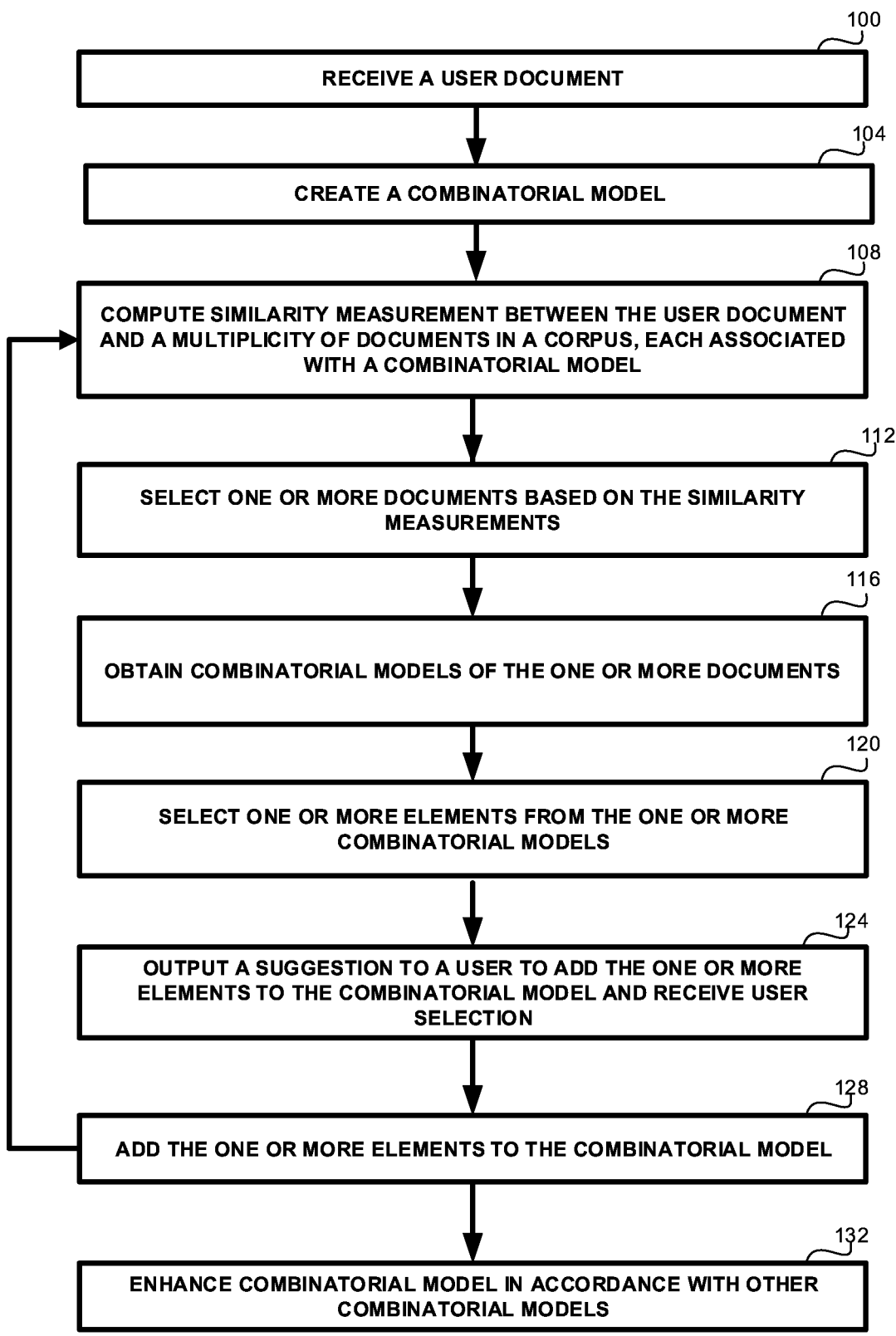

| | | | | |
|---|---|---|---|---|
| 8,990,626 | B2* | 3/2015 | Farchi | G06F 11/008 |
| | | | | 714/37 |
| 9,218,271 | B2* | 12/2015 | Segall | G06F 11/3676 |
| 9,417,854 | B1* | 8/2016 | Agrawal | G06F 8/35 |
| 9,454,466 | B2* | 9/2016 | Ivrii | G06F 17/504 |
| 9,569,343 | B2* | 2/2017 | Boden | G06F 11/3672 |
| 2004/0031015 | A1* | 2/2004 | Ben-Romdhane | G06F 8/75 |
| | | | | 717/107 |
| 2005/0235260 | A1* | 10/2005 | Matsutsuka | G06F 8/38 |
| | | | | 717/114 |
| 2008/0201133 | A1* | 8/2008 | Cave | G10L 15/1815 |
| | | | | 704/10 |
| 2010/0023505 | A1* | 1/2010 | Tateishi | G06F 16/3331 |
| | | | | 707/E17.008 |
| 2010/0274520 | A1* | 10/2010 | Ur | G06F 11/3676 |
| | | | | 702/123 |
| 2010/0287534 | A1* | 11/2010 | Vangala | G06F 11/3612 |
| | | | | 717/124 |
| 2011/0083121 | A1* | 4/2011 | Dixit | G06F 11/3684 |
| | | | | 717/124 |
| 2012/0291007 | A1* | 11/2012 | Bagheri | G06F 40/186 |
| | | | | 717/106 |
| 2013/0086553 | A1* | 4/2013 | Grechanik | G06F 8/71 |
| | | | | 717/123 |
| 2013/0090911 | A1* | 4/2013 | Segall | G06F 11/263 |
| | | | | 703/21 |
| 2013/0275939 | A1* | 10/2013 | Tzoref-Bill | G06F 11/3676 |
| | | | | 717/105 |
| 2013/0339373 | A1* | 12/2013 | Patton | G06F 16/90324 |
| | | | | 707/749 |
| 2014/0372083 | A1* | 12/2014 | Hsu | G06F 17/5009 |
| | | | | 703/1 |
| 2015/0254167 | A1* | 9/2015 | Farchi | G06F 11/3688 |
| | | | | 717/124 |
| 2015/0269153 | A1* | 9/2015 | Fink | G06F 40/30 |
| | | | | 707/750 |
| 2015/0286977 | A1* | 10/2015 | Schneeman | G06Q 10/06393 |
| | | | | 705/7.39 |
| 2015/0339310 | A1* | 11/2015 | Pursche | G06F 16/93 |
| | | | | 707/726 |
| 2016/0125169 | A1* | 5/2016 | Finn | G06F 16/951 |
| | | | | 707/692 |
| 2017/0060734 | A1* | 3/2017 | Raz | G06F 11/3684 |
| 2018/0052933 | A1* | 2/2018 | Verma | G06Q 50/01 |

* cited by examiner

METHOD AND APPARATUS FOR TEST MODELING

TECHNICAL FIELD

The present disclosure relates to testing in general, and to a method and apparatus for generating models for testing using existing models, in particular.

BACKGROUND

Effective software testing is crucial to achieving a competitive software product. Testing may be part of any stage of the product development, including design, unit testing, system testing, or the like. Testing may be planned and implemented by generating and executing a test model.

A combinatorial model for testing a system is also referred to as Cartesian-product model, and comprises a set of attributes, values or value ranges for the attributes (also referred to as domains), and restrictions on value combinations that may not appear together. Such a model spans a space of valid tests for a tested design, unit, system or any other entity: each combination of values to the attributes that does not violate any restriction corresponds to a valid test. Each combination of attributes or a subset of attributes, which is excluded by one or more restrictions, is referred to as an illegal combination.

For example, a model for testing a computer may comprise a CPU attribute with possible values consisting of the available CPUs, an operating system (OS) attribute with possible values consisting of the available OSs, and restrictions that rule out impossible CPU and OS combinations, such as a low performance CPU with modern high-resource-consuming OS.

Combinatorial models have a variety of usages. One such usage is functional coverage analysis of a System Under Test. Another usage is in Combinatorial Test Design (CTD). CTD is a test planning technique that selects a small subset of the valid test space that covers a predefined coverage goal. The coverage goal may define an interaction level of attributes that are to be covered, such as every n-wise combinations of values.

Preparing a combinatorial model for a system may be a difficult task for a user, such as a verification engineer, a QA staff member, or the like. In particular, defining the attributes and values, and correctly capturing the restrictions over the model may be important yet labor-intensive and non-trivial tasks. Incorrect or suboptimal capturing of the attributes may lead to a problematic model that cannot provide the intended usage. Under-restricting the model may yield tests that cannot be executed and may cause coverage gaps if such tests are skipped or manually modified, while over-restricting the model may also yield coverage gaps in the areas that are wrongly restricted.

BRIEF SUMMARY

One exemplary embodiment of the disclosed subject matter is a computer-implemented method comprising: receiving a user document describing at least a part of a system to be tested; computing a similarity measurement between the user document and documents in a document corpus, wherein each document in the document corpus describes at least part of a system and is associated with a combinatorial model representing the at least part of the system, wherein the combinatorial model defines a test space, the combinatorial model comprising a set of attributes, a respective domain for each attribute defining possible values for the attribute, and restrictions, wherein each restriction of the restrictions comprises at least one attribute, a respective value thereof and a logical operator; based upon the similarity measurement, selecting one or more selected documents from the document corpus; obtaining one or more combinatorial models corresponding to the one or more selected documents; selecting one or more elements from the one or more combinatorial models; and generating an initial combinatorial model for the user document, wherein said generating comprises Another exemplary embodiment of the disclosed subject matter is a system having a processor, the processor being adapted to perform the steps of: receiving a user document describing at least a part of a system to be tested; computing a similarity measurement between the user document and documents in a document corpus, wherein each document in the document corpus describes at least part of a system and is associated with a combinatorial model representing the at least part of the system, wherein the combinatorial model defines a test space, the combinatorial model comprising a set of attributes, a respective domain for each attribute defining possible values for the attribute, and restrictions, wherein each restriction of the restrictions comprises at least one attribute, a respective value thereof and a logical operator; based upon the similarity measurement, selecting one or more selected documents from the document corpus; obtaining one or more combinatorial models corresponding to the one or more selected documents; selecting one or more elements from the one or more combinatorial models; and generating an initial combinatorial model for the user document, wherein said generating comprises adding the one or more elements to the initial combinatorial model.

Yet another exemplary embodiment of the disclosed subject matter is a computer program product comprising a non-transitory computer readable medium retaining program instructions, which instructions when read by a processor, cause the processor to perform a method comprising: receiving a user document describing at least a part of a system to be tested; computing a similarity measurement between the user document and documents in a document corpus, wherein each document in the document corpus describes at least part of a system and is associated with a combinatorial model representing the at least part of the system, wherein the combinatorial model defines a test space, the combinatorial model comprising a set of attributes, a respective domain for each attribute defining possible values for the attribute, and restrictions, wherein each restriction of the restrictions comprises at least one attribute, a respective value thereof and a logical operator; based upon the similarity measurement, selecting one or more selected documents from the document corpus; obtaining one or more combinatorial models corresponding to the one or more selected documents; selecting one or more elements from the one or more combinatorial models; and generating an initial combinatorial model for the user document, wherein said generating comprises adding the one or more elements to the initial combinatorial model.

THE BRIEF DESCRIPTION OF THE SEVERAL VIEWS OF THE DRAWINGS

Figure 2:
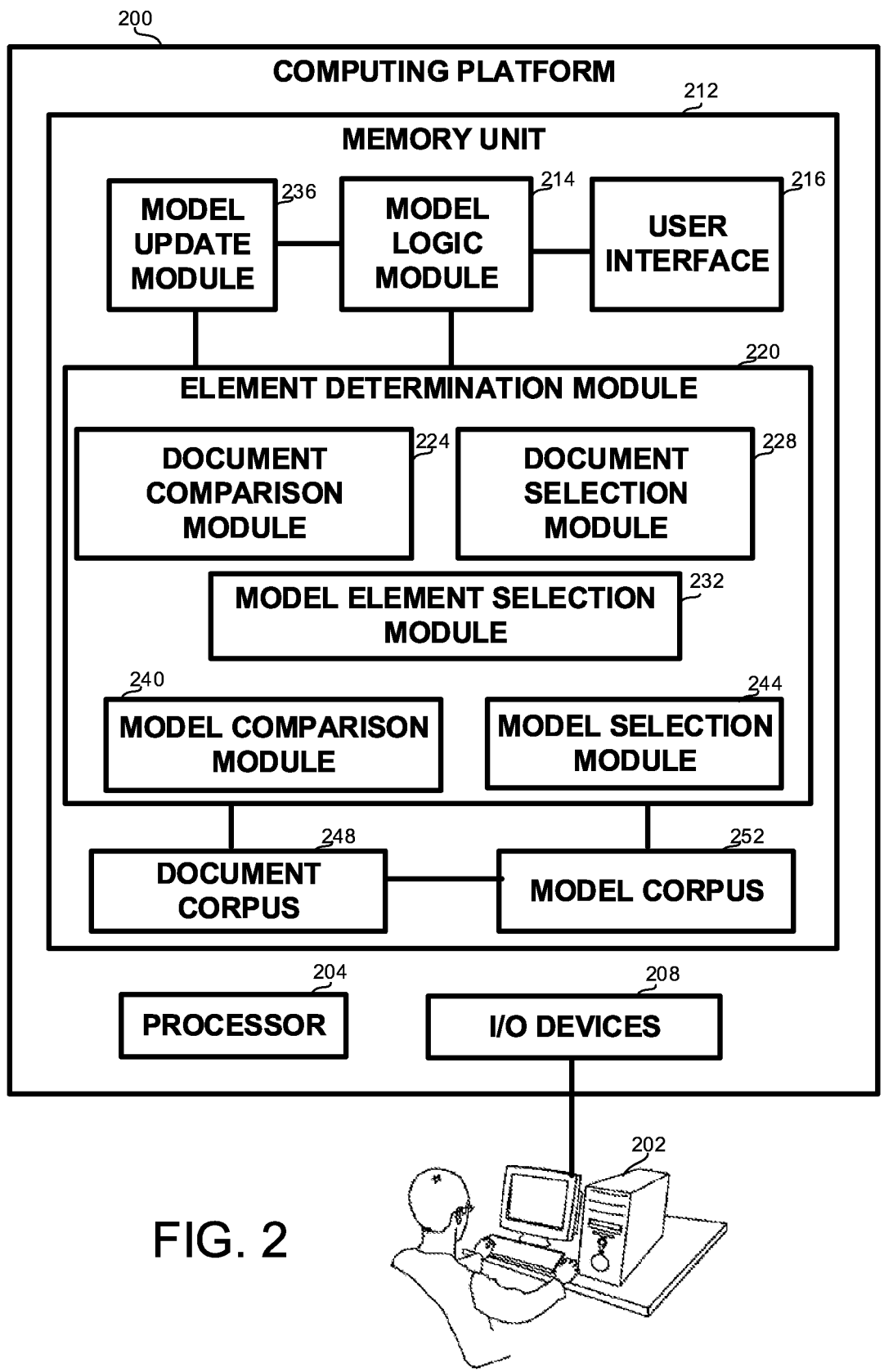

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a flowchart diagram of a method of generating a combinatorial model, in accordance with some exemplary embodiments of the disclosed subject matter; and FIG. 2 shows a block diagram of a computing device configured for generating a combinatorial model, in accordance with some exemplary embodiments of the disclosed subject matter.

DETAILED DESCRIPTION

Testing is an important part of the development of any new product. Testing can and should be integrated with any stage of the development, including design, implementation, unit testing, integration, or the like.

Testing may require a model of the test space of the system or environment. If a model of the test space exists, various technologies may be utilized to ease and even automate the test planning, test reduction, and test execution tasks. However, creating a model is a challenging task that requires manual effort and expert skills and knowledge both of the system and of the testing development environment.

A combinatorial model, also referred to as Cartesian-product model of a system, is a set of attributes, values or value ranges for the attributes (also referred to as domains), and restrictions on value combinations that may not appear together, the restriction comprising at least one attribute, a respective value thereof and a logical operator.

Such a model spans a space of valid tests for a tested design, unit, system or any other entity: each combination of values to the attributes that does not violate any restriction corresponds to a valid test. Each combination of attributes or a subset of attributes, which is excluded by one or more restrictions, is referred to as an illegal combination.

For example, a testing model for a software system may comprise an attribute of an operating system (OS) attribute having possible values of Windows, Linux, iOS, etc., and a browser attribute having possible values of Internet Explorer (IE) and Chrome. Since the IE browser can only work with Windows OS, a restriction can be set that bars the combination of the Linux OS and IE, and the combination of iOS and IE.

Another example relates to a model used by a car insurance company:

A quotation attribute may have values: New_Lenghty, New_Quick Requote_Lenghty, or Requote_Quick.

A Policy_Type attribute may have values: New, Renewal or Endorsement.

A Policy_end_date attribute may have values:
greater_than_7to12_months_of_start_date,
greater_than_4to6_months_of_start_date,
greater_than_1to3_months_of_start_date,
same_as_Policy_start_Date or Less_than_Start_date.

A Vehicle_type attribute may have values: A, B, C or D.

A Type_of_Vehicle attribute may have values: Existing, Old or New.

An Age_of_vehicle attribute may have values: 0-1, 2-5, 6-10, 11-15 or over 15.

A Vehicle_Market_value_dollars attribute may have values: 1000-3000, 3000-5000, 5000-10000, 10000-15000, 15000-20000, or over 20000.

A Policy_start_date attribute may have values: Futuredate<365_dates, Current_Date, Lessthan_current_Date, Less_7days_of_end_Date, or Futuredate>365_dates.

Additional attributes may include Emergency_Road_Service, Rental_reimbruisment, Upgraded_Accident_Forgiveness, Personal_Injury_Protection, Electrical_Accessories_value, Non_Electrical_Accessories, Collision, Excess_vehicle, Loyalty, Number_of_Claims, Type_of_Antitheft, Customer_Gender, Is_customer_also_driver, Customer_Age_group, Driver_Age_group, Named_or_Unnamed_driver, Number_of_Drivers, Driver_Experience, No_of_Major_Violations, and Parking_Type.

Exclusion restriction examples may include:
Policy_Type="Renewal" and Loyalty "0Years"
Age_of_vehicle="0-1" and Vehicle_Market_value_dollars.equals("1000")
Vehicle_type="A" and Age_of_vehicle="0-1" and Vehicle_Market_value_dollars="greaterthan20000"
Vehicle_type="B" and Age_of_vehicle="11-15" and Vehicle_Market_value_dollars="1000-3000"

If-then restrictions may include:
(Policy_Type=New)→(Loyalty=0Years)
(Driver_Age=Lessthan18)→(Driver_experience=1-2)
(Vehicle_type=B AND Age_of_vehicle=11-15)→(Vehicle_Market_value_dollars==1000-3000, 3000-5000, 5000-10000)

If and only if restrictions may include:
(Excess_Vehicle=None)→(Vehicle_Count=0)

One technical problem dealt with by the disclosed subject matter is the need to create testing models for a new system. Nowadays there is a crucial need in safety-critical systems that test designers specify, write and verify certain properties early in their design process. However, designers are often not experts in the field of the tested system and may not be proficient in the languages used to define the specification. Moreover, even for experienced designers, time is of essence, thus it is always desired to speed the model development.

Furthermore, one or more documents may exist for the new system, such as descriptions, user stories, requirement documents, design documents, etc. Although significant amount of knowledge about the system may be embedded within these documents, this knowledge is currently unusable for creating models, and no reduction in the model generation time can be achieved using the documents.

It will be appreciated that although the disclosure below relates to combinatorial models, the disclosure is not limited to such models, and models of other types may be generated in an analogous manner.

Often, models exist in which such knowledge or partly overlapping knowledge has already been compiled or captured for other purposes. Examples include other models, associated for example with similar products, previous versions of a developed product, partial systems which have parts that may be utilized in the current problem space, or the like.

Thus, one technical solution is a user-guided automatic or semi-automatic model generation, which receives a given document describing the system or aspects thereof, and searches within a document corpus for other documents, similar to the given document, wherein each of these documents is associated with a model of a system described by the document. Each such model may contain a collection of attributes, possible values or value ranges for each attribute, and one or more restrictions, wherein a restriction defines one or more combinations of attribute values that are illegal and are excluded from a legal test case.

Once one or more such documents are selected based on their similarity to the given document, elements may be selected from the one or more models associated with the documents, including attributes, values or restrictions. An initial model may be created, and the selected elements may be added to the initial model automatically, or after displaying to the user the option to add the elements and receiving the user's confirmation. The process may continue with adding further elements to the model, based on similarity to additional documents.

The similarity measurement between documents may be determined in accordance with words or word combinations common to the user document and to each document of the corpus of documents. If the document and documents from the corpus are of comparable structure, for example HTML documents, then the similarity measurement may be obtained by comparing the structures.

Once an initial or a more advanced model has been created, further elements may be added by comparing the model to other models, whether any of the other models is based on a document or not, and enriching the model with elements from the other models.

One technical effect of the disclosure provides for fast and efficient model generation based on one or more documents related to the system, and on existing models for other systems, wherein the existing models are associated with other documents. Attributes, values or restrictions are automatically added to the model, thus saving time and labor for a user generating the model, and reducing the time required for providing a testing model. Typically, the generation process may accelerate as work proceeds, since once an initial model is available, further elements can be added, based on similarity between the initial model and other available models.

Another technical effect of the disclosure relates to keeping uniformity and standard compliance between models, by using, for example, the same naming conventions, spelling for attribute names or values, same values for attributes, same restrictions where applicable, or the like.

The disclosed subject matter may provide for one or more technical improvements over any pre-existing technique and any technique that has previously become routine or conventional in the art.

Additional technical problems, solutions and effects may be apparent to a person of ordinary skill in the art in view of the present disclosure.

The term "element" as used herein is to be widely construed as any one or more parts of a model. For example, in a combinatorial model an element may be an attribute, an attribute value, a collection of attribute values, a restriction, or the like.

Referring now to FIG. 1, showing a method for creating a testing model in accordance with some embodiments of the disclosure.

On step 100, a user document describing a system or an aspect thereof may be received. For example, the document may be a requirement document, a design document, a user manual, a user story or the like.

The document may be received via computer communication, retrieved from storage, typed, otherwise received from a user using one or more Input/Output (I/O) devices to operate a user interface, or the like. The document may be textual, structured, or have any other format.

On step 104, a combinatorial model may be created for the system. The combinatorial model may comprise the infrastructure and be a-priory empty, or may have any one or more default attributes, values or constraints. In some embodiments, step 104 can be performed as part of another step, such as step 128 below.

On step 108, a similarity measurement can be computed between the user document and a multiplicity of documents in a corpus of documents available for comparison, wherein each document in the corpus of documents may be associated with a combinatorial model.

The comparison may be performed depending on the type of documents. For example, free-text documents can be compared based on word or word combination similarity. As known in the art of natural language processing (NLP), different weights may be assigned to different words. For example, words that are more unique or rare in the language are assigned higher weight, meaning that if such words appear in two documents, the documents may be considered more similar than if they only have frequent words in common. In some embodiments, word combinations may be considered, such that if two documents have a sequence of multiple words in the same order, possibly within a sequence of at most a certain number of words, they may be considered more similar than if the words appear in a different order, or within a longer sequence. In some embodiments, further text analysis may be performed, wherein the subject(s) of documents may be extracted, and documents having more subjects in common may be considered more similar. It will be appreciated that the above criteria are exemplary only, and multiple other criteria or combinations thereof may be applied towards assessing similarity between texts.

If the documents are structured documents, then the comparison may depend on the specific structure and content of the documents. For example, when comparing HTML documents it is possible to compare not only the textual content but also the HTML structure. The structure may also indicate which parts of the document are to be compared. For example, a form structure may suggest comparing the text field-wise, rather than comparing the entire texts.

In some embodiments, comparison can be based on one or more characteristics or computed representation of each document, wherein higher characteristic similarity implies higher similarity between the documents. Some examples for characteristics include a hash value, code that represents entities, or another computed characteristic of the document data, owner, author, a combination thereof, or others.

In some embodiments, when version control is available, the history of the documents may be retained and used. For example, recently added words can have a higher or lower contribution to the similarity measurement.

In some embodiments, similarity, for example of names, may or may not be exact. For example, names or other words may be searched in a fuzzy manner with different spelling, with common spelling mistakes, in singular/plural forms, or the like.

On step 112, given the similarity measurements between the user document and one or more of the documents in the corpus which have models, at least one document may be selected, based on the similarity measurements. For example, a predetermined number of documents having the highest similarity can be selected, a predetermined percentage of the document having the highest similarity can be selected, all document having similarity measurement exceeding a threshold can be selected, or the like.

Additionally or alternatively, if two or more documents have the same common words or word combinations with the user document, then the two or more documents may be selected even if the similarity measurement between each of the documents and the user document is insufficient for the document to be selected.

On step 116, the combinatorial models associated with the selected documents may be obtained.

On step 120, one or more elements, such as an attribute, a value of an attribute or a restriction may be selected from the obtained models to be added to initial model as created.

The specific element or elements to be added can be determined from the model arbitrarily or based on predetermined criteria or priorities.

In some embodiments, the elements to be selected may be determined based on elements common to at least two of the obtained models. For example, if two or more obtained models have common elements, these elements may be selected. In particular, elements that are common to more models associated with selected documents, may be selected with higher priority. In some embodiments, the selected elements can include elements that are comprised in a number of models from the selected models that exceeds a threshold. In some embodiments, if two models have a same attribute with one or more common values, then the attribute may be added to the created model with the common values, and optionally additional values present in one of the models. In some embodiments, elements from the one or more selected combinatorial models can be mapped to features in the corresponding documents, such that elements corresponding to features appearing in the user document may be selected, thus selecting elements corresponding to keywords appearing in the user document.

On step 124, once one or more suggestions to elements to be added to the created model may be output to a user, using a user interface. The elements may be presented to the user one at a time, and the user may accept or reject each of them individually. Alternatively, a plurality of suggested elements may be displayed to the user and the user may select the ones to be added, for example by clicking on check boxes. In yet another alternative, a multiplicity of elements can be suggested as a block, which the user can accept or reject. In further embodiments, a full model can be suggested for the generated model. The user selection regarding one or more elements to be added to the model may then be received.

On step 128, the selected elements may be added to the model. The model is thus created or further enhanced with the selected elements. If step 124 has been performed, then the addition may be subject to user approval.

The process can be repeated for identifying further documents and further elements to be added.

On step 132, the created model can be enhanced based on similarity to other models available in a model corpus, whether these models are associated with documents or not. Such enhancement can be performed as disclosed, for example, in U.S. patent application Ser. No. 15/818,770 filed Nov. 21, 2017 and titled "A Method and Apparatus for Test Modeling", incorporated herein by reference in its entirety and for all purposes.

Enhancing the generated model with elements from other models may comprise: computing a similarity measurement between the created model and each model in the model corpus, wherein the similarity measurement is computed based on similarity of attributes and respective domains; selecting one or more models from the model corpus in accordance with the similarity measurements; determining elements from the one or more selected models to be added to the generated model; and adding the elements to the created model.

Thus, the disclosed method provides for generating an initial model for a system. Elements may then be added which are selected from models associated with user documents similar to a user document describing the system. The model may then be enhanced or extended based on similarity to other available models.

It will be appreciated that at any stage a user can manually continue creating the model, for example manually add or change attributes, values, restrictions or the like.

Referring now to FIG. 2 showing a block diagram of a computing platform, in accordance with some exemplary embodiments of the disclosed subject matter.

A computing platform 200 depicted in FIG. 2, may be configured to assist a user 202 in creating a model such as a combinatorial model, based on a user document and existing corpus of user documents, each associated with a combinatorial model, and optionally additional models.

In some exemplary embodiments computing platform 200 may comprise a processor 204, which may be a Central Processing Unit (CPU), a microprocessor, an electronic circuit, an Integrated Circuit (IC) or the like. Processor 204 may be utilized to perform computations required by computing platform 200 or any of it subcomponents. Processor 204 may be configured to execute computer-programs useful in performing the method of FIG. 1.

In some exemplary embodiments, one or more I/O devices 208 may be configured to receive input from and provide output to user 202. In some exemplary embodiments, I/O devices 208 may be utilized to visually present to user 202 a model, elements to be added, or other data or options on a display device, and/or vocally using a speaker. I/O devices 208 may also be utilized to obtain user input instructions useful in creating the model, such as keyboard input, input from a pointing device such as a mouse or a touch screen, or the like.

In some exemplary embodiments, a memory unit 212 associated with computing platform 200 may be a short-term storage device or long-term storage device. Memory unit 212 may be a persistent storage or volatile storage. Memory unit 212 may be a disk drive, a Flash disk, a Random Access Memory (RAM), a memory chip, or the like. In some exemplary embodiments, memory unit 212 may retain program code operative to cause processor 204 to perform acts associated with any of the subcomponents of computing platform 200. In some exemplary embodiments, memory unit 212 may retain program code operative to cause processor 204 to perform acts associated with any of the steps shown in FIG. 1 above.

Computing platform 200 can retain, for example on a memory unit 212 or on a memory device operatively connected to memory unit 212, document corpus 248 comprising a multiplicity of user documents, and model corpus 252 comprising models such as partial or complete combinatorial models, some of which may be associated with documents from document corpus 248. It will be appreciated that memory unit 212 can comprise components for storing, retrieving or obtaining one or more documents or models.

The components detailed below may be implemented as one or more sets of interrelated computer instructions, executed for example by processor 204 or by another processor. The components may be arranged as one or more executable files, dynamic libraries, static libraries, methods, functions, services, or the like, programmed in any programming language and under any computing environment.

Memory unit 212 may retain model logic module 214 configured for maintaining one or more models such as combinatorial models, for example as a data structure, making sure the model is consistent, performing operations on a model such as adding, deleting or changing elements, or the like.

Memory unit 212 may retain user interface 216, which may be a graphic user interface (GUI), for presenting to user 202 using any one or more of I/O devices 208 a model, addition or modification suggestions, or the like, and receiving from user 202 over any one or more of I/O devices 208 input such as a text document or another document, new or updated model elements, relationships between elements, element order, restrictions, or the like. User interface 216 can further react to user responses to addition or modification suggestions.

Memory unit 212 may retain element determination module 220, for determining elements to be added to a model.

Element determination module 220 may comprise document comparison module 224, configured for computing a similarity measure between a user document and a document from a document corpus 248, wherein the document is associated with a model, as described in association with step 108 of FIG. 1.

Element determination module 220 may comprise document selection module 228 configured for selecting one or more documents from document corpus 248 based on the similarity measurements determined by document comparison module 224.

Element determination module 220 may comprise model element selection module 232 for selecting one or more elements from the models associated with the selected documents, to be added to the created model, as described in association with step 120 above.

Document comparison module 224, document selection module 228 and model element selection module 232 are operative in determining elements to be added, based on similarity between the user document and additional documents.

In addition, element determination module 220 may comprise components for enhancing and continuing creation of the model after an initial model has been created and populated upon a user document. The model can be enhanced using elements from other models similar to it.

Thus, element determination module 220 can comprise model comparison module 240, configured for computing a similarity measure between a model being generated and models from model corpus 252.

Element determination module 220 may comprise model selection module 244 configured for selecting one or more models from model corpus 252 based on the similarity computed by model comparison module 240.

Model element selection module 232, in addition to being configured to select elements from models obtained in accordance with the similarity of their associated documents to the user document, can also be operative in selecting elements from the models selected by model selection module 244.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
    receiving a free-text user document describing at least a part of a system to be tested, wherein the free-text user document is selected from a group consisting of: a system requirement document of the system, a system design document of the system, and a user manual of the system, wherein it is required to generate a model for the at least part of the system, based on the free-text user document;
    computing similarity measurements between the free-text user document and free-text documents in a document corpus,
        wherein each of the free-text documents describes at least part of a system and is associated with a combinatorial model representing the at least part of the system, wherein the combinatorial model defines a test space, the combinatorial model comprising a set of attributes, a respective domain for each attribute defining possible values for the attribute, and restrictions, wherein each restriction of the restrictions comprises at least one attribute, a respective value thereof and a logical operator,
        wherein each similarity measurement is computed in accordance with words common to the free-text user document and one of the free-text documents,
        whereby each similarity measurement is computed based on textual similarity between one or more words in the free-text user document and the one of the free-text documents in the document corpus,
        and wherein said computing comprises assigning weights to words and word combinations, whereby different weights are assigned to different words or different word combinations;
    based upon the similarity measurements, selecting one or more selected free-text documents from the document corpus;
    obtaining one or more combinatorial models corresponding to the one or more selected free-text documents;
    selecting one or more elements from the one or more combinatorial models; and
    generating an initial combinatorial model for the free-text user document, wherein said generating comprises adding the one or more elements to the initial combinatorial model.

2. The computer-implemented method of claim 1, wherein the restriction comprises an illegal combination of attribute values.

3. The computer-implemented method of claim 1, wherein the similarity measurement is determined based on a computed representation of the free-text user document and signatures of each free-text document of the set of free-text documents.

4. The computer-implemented method of claim 1, wherein the one or more selected free-text documents are selected in accordance with similarity among the one or more selected free-text documents.

5. The computer-implemented method of claim 1, wherein said selecting the one or more elements comprises:

selecting common elements appearing in two or more models of the one or more combinatorial models.

6. The computer-implemented method of claim 5, wherein said selecting common elements comprises selecting an attribute appearing in the two or more models.

7. The computer-implemented method of claim 6, wherein said selecting further comprises selecting values from the two or more models for the attribute.

8. The computer-implemented method of claim 1, wherein said selecting the one or more elements comprises: mapping elements of the one or more combinatorial models to features in corresponding documents, wherein the selection is performed based on similarity measurement of the features with features of the free-text user document.

9. The computer-implemented method of claim 1, further comprising outputting a suggestion to a user to add the one or more elements to an initial combinatorial model, wherein adding the one or more elements to the initial combinatorial model is subject to user confirmation.

10. The computer-implemented method of claim 1, wherein the free-text user document provides a partial description of the system to be tested; wherein the computer-implemented method further comprising:
  computing a second similarity measurement between the model and each model in a model corpus of existing combinatorial models, wherein the second similarity measurement is computed based on similarity of attributes of the models and respective domains thereof, whereby the second similarity measurements are computed differently than the similarity measurements;
  selecting one or more selected models from the model corpus in accordance with the second similarity measurement computed for models of the existing combinatorial models;
  determining one or more second elements from the one or more selected models to be provided as a modification suggestion for modifying the partial description; and
  outputting the modification suggestion to modify the partial description based on the one or more elements, whereby the modification suggestion is useful in completing the partial description to create the combinatorial model.

11. A system having a processor, the processor being adapted to perform the steps of:
  receiving a free-text user document describing at least a part of a system to be tested, wherein the free-text user document is selected from a group consisting of: a system requirement document of the system, a system design document of the system, and a user manual of the system, wherein it is required to generate a model for the at least part of the system, based on the free-text user document;
  computing similarity measurements between the free-text user document and free-text documents in a document corpus,
    wherein each of the free-text documents describes at least part of a system and is associated with a combinatorial model representing the at least part of the system, wherein the combinatorial model defines a test space, the combinatorial model comprising a set of attributes, a respective domain for each attribute defining possible values for the attribute, and restrictions, wherein each restriction of the restrictions comprises at least one attribute, a respective value thereof and a logical operator,
    wherein each similarity measurement is computed in accordance with words common to the free-text user document and one of the free-text documents,
    whereby each similarity measurement is computed based on textual similarity between one or more words in the free-text user document and the one of the free-text documents in the document corpus,
    and wherein said computing comprises assigning weights to words and word combinations, whereby different weights are assigned to different words or different word combinations;
  based upon the similarity measurements, selecting one or more selected free-text documents from the document corpus;
  obtaining one or more combinatorial models corresponding to the one or more selected free-text documents;
  selecting one or more elements from the one or more combinatorial models; and
  generating an initial combinatorial model for the free-text user document, wherein said generating comprises adding the one or more elements to the initial combinatorial model.

12. The system of claim 11, wherein the restriction comprises an illegal combination of attribute values.

13. The system of claim 11, wherein said selecting the one or more elements comprises: selecting common elements appearing in two or more models of the one or more combinatorial models.

14. The system of claim 13, wherein said selecting common elements comprises selecting an attribute appearing in the two or more models and selecting values from the two or more models for the attribute.

15. The system of claim 11, wherein said selecting the one or more elements comprises: mapping elements of the one or more combinatorial models to features in corresponding documents, wherein the selection is performed based on similarity measurement of the features with features of the free-text user document.

16. The system of claim 11 wherein the processor is further adapted to output a suggestion to a user to add the one or more elements to an initial combinatorial model, wherein adding the one or more elements to the initial combinatorial model is subject to user confirmation.

17. The system of claim 11 wherein the free-text user document provides a partial description of the system to be tested; wherein the processor is further adapted to:
  compute a second similarity measurement between the model and each model in a model corpus of existing combinatorial models, wherein the second similarity measurement is computed based on similarity of attributes of the models and respective domains thereof, whereby the second similarity measurements are computed differently than the similarity measurements;
  select one or more selected models from the model corpus in accordance with the second similarity measurement computed for models of the existing combinatorial models;
  determine one or more second elements from the one or more selected models to be provided as a modification suggestion for modifying the partial description; and
  output the modification suggestion to modify the partial description based on the one or more elements, whereby the modification suggestion is useful in completing the partial description to create the combinatorial model.

18. A computer program product comprising a non-transitory computer readable medium retaining program instructions, which instructions when read by a processor, cause the processor to perform a method comprising:

receiving a free-text user document describing at least a part of a system to be tested, wherein the free-text user document is selected from a group consisting of: a system requirement document of the system; a system design document of the system, and a user manual of the system, wherein it is required to generate a model for the at least part of the system, based on the user free-text document;

computing similarity measurements between the free-text user document and free-text documents in a document corpus, wherein each of the free-text documents describes at least part of a system and is associated with a combinatorial model representing the at least part of the system, wherein the combinatorial model defines a test space, the combinatorial model comprising a set of attributes, a respective domain for each attribute defining possible values for the attribute, and restrictions, wherein each restriction of the restrictions comprises at least one attribute, a respective value thereof and a logical operator, wherein each similarity measurement is computed in accordance with words common to the free-text user document and one of the free-text documents, whereby each similarity measurement is computed based on textual similarity between one or more words in the free-text user document and the one of the free-text documents in the document corpus, and wherein said computing comprises assigning weights to words and word combinations, whereby different weights are assigned to different words or different word combinations;

based upon the similarity measurements, selecting one or more selected free-text documents from the document corpus;

obtaining one or more combinatorial models corresponding to the one or more selected free-text documents;

selecting one or more elements from the one or more combinatorial models; and generating an initial combinatorial model for the free-text user document, wherein said generating comprises adding the one or more elements to the initial combinatorial model.

\* \* \* \* \*